United States Patent
Inbar et al.

(10) Patent No.: US 7,379,164 B2
(45) Date of Patent: May 27, 2008

(54) LASER GATED CAMERA IMAGING SYSTEM AND METHOD

(75) Inventors: Shamir Inbar, Haifa (IL); Ofer David, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 10/545,765

(22) PCT Filed: Feb. 4, 2004

(86) PCT No.: PCT/IL2004/000112

§ 371 (c)(1),
(2), (4) Date: Jun. 1, 2006

(87) PCT Pub. No.: WO2004/072678

PCT Pub. Date: Aug. 26, 2004

(65) Prior Publication Data

US 2006/0250497 A1 Nov. 9, 2006

(30) Foreign Application Priority Data

Feb. 16, 2003 (IL) .................................. 154479

(51) Int. Cl.
*G01C 3/08* (2006.01)
(52) U.S. Cl. .................................... 356/5.04
(58) Field of Classification Search ................ 356/5.04
See application file for complete search history.

(56) References Cited

U.S. PATENT DOCUMENTS 4,920,412 A * 4/1990 Gerdt et al. ................... 348/31
5,335,070 A * 8/1994 Pflibsen et al. ................ 348/31
5,408,541 A * 4/1995 Sewell ........................ 382/291
6,836,285 B1 * 12/2004 Lubard et al. ................ 348/31

FOREIGN PATENT DOCUMENTS

GB 2 308 763 7/1997

OTHER PUBLICATIONS

International Search Report(Form PCT/ISA/210) Jun. 2004 (3 pages).
Written Opinion of International Searching Authority (Form PCT/ISA/237) Jun. 2004 (7 pages).
International Preliminary Report on Patentability, with Annexes (Form PCT/IPEA/409) Mar. 2005 (17 pages).

* cited by examiner

*Primary Examiner*—Thomas H. Tarcza
*Assistant Examiner*—Luke D Ratcliffe
(74) *Attorney, Agent, or Firm*—Edwards Angell Palmer & Dodge, LLP

(57) ABSTRACT

A gated camera imaging system and method, utilizing a laser device for generating a beam of long duration laser pulses toward a target. A camera receives the energy of light reflexes of the pulses reflected from the target. The camera gating is synchronized to be set OFF for at least the duration of time it takes the laser device to produce a laser pulse in its substantial entirety, including an end of the laser pulse, in addition to the time it takes the laser pulse to complete traversing a zone proximate to the system and back to the camera, and set ON for an ON time duration thereafter until the laser pulse reflects back from the target and is received in the camera. The laser pulse width substantially corresponds to at least the ON time duration. Preferably, the laser device includes a Diode Laser Array (DLA).

24 Claims, 5 Drawing Sheets

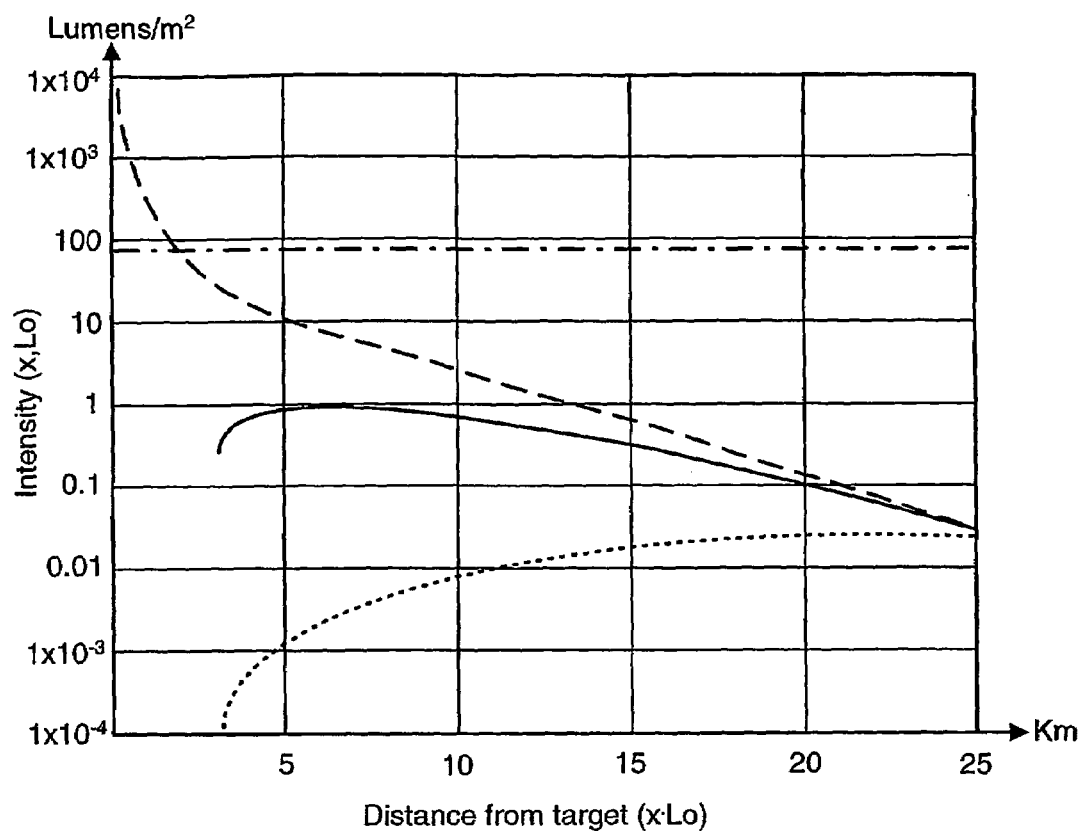

— Gated target irradiance (IGL)
····· Gated backscatter radiant intensity (IRAg)
— — Non-gated target irradiance (IL)
— · — Non-gated backscatter radiant intensity (IRAng)

Effective gated and non-gated laser irradiance on target and backscatter radiant intensity (lumens per square meter) as a function of range (kilometers), in Long Pulse Gated Imaging (LPGI)

| V = 15 km | Sea level visibility range |
| H = 3 km | Platform/Target height above sea level |
| Lm = 3 km | Minimal range |
| Lo = 25 km | Optimal gating range |

FIG. 2

LASER GATED CAMERA IMAGING SYSTEM AND METHOD

FIELD OF THE INVENTION

The present invention relates in general to the field of optical observation systems, and more particularly, to a long range, day and night TV channel observation system that operates using the gated imaging principle, and to methods implemented in such systems.

BACKGROUND OF THE INVENTION

Known within long-range surveillance and observation systems is the method of target detection and identification using TV systems that include a camera and a long focal lens.

The light collecting capability of long focal lenses is limited due to volume, weight and cost constraints.

Even when a camera includes in its setup an SLS (Star Light System), under conditions of inferior visibility, the natural background light intensity is not sufficient to enable the production of an image with adequate signal to noise ratio for exploiting the total resolution capability of the camera and to discern the fine details of the target in order to obtain its identification in the image.

At night such TV systems require adding an auxiliary light source illuminating the target in order to improve the received picture quality. Such an auxiliary light source can be a laser device capable of producing a light beam that is parallel to the line of sight (hereinafter LOS) of the camera and that illuminates the field of view (hereinafter FOV) of the camera or a part thereof.

A known problem inherent in surveillance and observation systems is the need to overcome inclement conditions such as: humidity, haze, fog, mist, smoke, or rain that might be present in the space between the surveillance and observation systems and the target being observed. A similar problem exists for observation systems operating in other media, for example, the influence of scattering in water in underwater observations being performed either from the air or in the water itself.

In TV surveillance and observation systems that are integrated with a laser device acting as the illuminating source as mentioned above, interference in the media between the system and the target, for example haze resulting from aerosols hovering in the air, in the case of atmospheric media, can cause backscatter of part of the laser beam. The backscatter of the laser beam results in self-blinding of the camera and thus reduces the contrast of the target relative to the background. Under nighttime conditions, contrast reduction results in significant lowering of the efficiency of target detection and identification in comparison to the attainable efficiency of target detection and identification in daytime light conditions.

In order to reduce the negative influences present in the space between the laser coupled TV surveillance and observation system and the target, the TV camera sensor is synchronized in time with the time in which the reflected energy from the laser illuminated target is due to be received in the optical assembly.

In this approach, a laser generates short light pulses at a given frequency with the TV camera activated at a similar frequency. The TV camera however is activated with a time delay that corresponds relatively to the frequency of the laser pulses.

Thus, when the laser beam light is sent to the target, the camera reception function is set to the OFF state. The laser light, traveling at the speed of light towards the target, impinges on the target and illuminates it and its nearby surroundings. A small part of the laser light is reflected back towards the camera.

Laser light reflected backwards as light reflexes from the media, for example the atmosphere, that is significantly close to the camera (relative to the distance between the camera and the target), reaches the camera when it is still set to the OFF state. The light is thus not received by the camera and does not influence nor reduce the contrast of the image.

In contra distinction, the light reflexes that reach the camera from the target and its adjacent surroundings arrive when the camera is already in the ON state, i.e. the reception state, and are thus fully collected.

The camera switches from the OFF to ON state in a time synchronized manner with the time it takes the pulse to travel to the target and back.

After reception of the image of the target, its adjacent vicinity, and its subsequent storage, the camera reverts to the OFF state and the system awaits the transmission of the next laser pulse.

This procedure is cyclically repeated in a rate established in accordance with the range to target, the speed of light, and the limitations set by the laser device and the camera.

Implementing this procedure enables the production of a dynamic image in real time.

The solution presented above is known as using gated television/TV to minimize backscatter by gating images of any intervening media between the target and the optical assembly.

U.S. Pat. No. 5,408,541 to Sewell entitled "Method and system for recognizing targets at long range ranges" describes a method that includes detection of the target, conducting a preliminary measurement of the range to target, and calculating the position relative to the coordinates in which the target was detected. Subsequently, the range data is fed into a gated television sensor that serves as the imaging device. Thereafter, the estimated area of the target is illuminated by a pulsed laser, in accordance with the measured range and relative location data. The energy returned from the target is processed and converted to display as a TV image.

U.S. Pat. No. 4,920,412 to Gerdt et al entitled "Atmospheric obscurant penetrating target observation system with range gating" describes a system for imaging a scene, obscured by atmospheric obscurants, and determining the range to illuminated targets in the scene. The system includes a television camera with a gated image intensifier. Short intense laser pulses are transmitted to different range slices in a scene in order to illuminate the scene. The image intensifier is gated on after a time delay equal to the round trip transit time of the pulse from a range slice of interest. The image intensifier is gated on for a time interval equal to the width of the laser pulse. One laser pulse per frame is transmitted and successive range slices are observed during successive frames by successively increasing the time delay. The range slice images are stored in a buffer and read out to a television display.

GB Patent No. 2,308,763 to Bagnall-Wild entitled "Laser range finders" describes a method and a system for reducing the reception of spurious reflected signals, termed 'clutter,' in laser range finders. The method includes selecting a pulse from a target object from a series of pulses including pulses reflected from clutter objects. Depending on the circumstance, either the last received pulse which exceeds a predetermined fraction of the maximum pulse amplitude is selected, or the first received pulse which exceeds a predetermined fraction of the maximum pulse amplitude is selected. The method also includes selecting a range window and discarding those pulses which lie outside the window, and defining a condition or set of conditions which enable the level of overspill of a laser light pulse over a target to be classified as either 'high' or 'low.'

It is noted that Sewell requires a preliminary range measurement by a designated laser range finder (ranger). The measuring line to the target of the laser ranger has to be parallel, in a very accurate manner, to the LOS of the observation system. An instrument of this kind can be bulky (both large and heavy), relatively expensive, and not necessarily applicable to all types of surveillance and observation systems. It is noted that the televised image, of the system of Gerdt, is constantly rewritten during observation, and that the image appears similar to slow scan television and may be slightly erratic for fast moving ships.

Thus there is a need for an observation system for day and night applications, based on the gated imaging principle, which can adapt to long range observations, which does not necessitate a preliminary range to target measurement.

SUMMARY OF THE INVENTION

According to a preferred embodiment of the invention a gated camera imaging system is provided which includes a laser device for generating a beam of laser energy in the form of long duration laser pulses toward a target. The system further includes a camera assembly that receives the energy of light reflexes of the pulses reflected from the target. The camera assembly gating is synchronized to be set OFF for at least the duration of time it takes the laser device to produce a laser pulse in its substantial entirety, including an end of the laser pulse, in addition to the time it takes the laser pulse to complete traversing a zone proximate to the system and back to the camera assembly. The camera assembly gating is synchronized to be set ON for an ON time duration thereafter until the laser pulse reflects back from the target and is received by the camera assembly. The laser pulse width substantially corresponds to at least the ON time duration of the camera assembly.

The system further includes an optical fiber for transferring the laser beam from the laser device to an optical fiber exit of the optical fiber, as well as a gimbal, comprising a gyro feedback, for stabilizing the camera assembly and the optical fiber exit of the optical fiber in a packaged module. The system also includes an image-process stabilizer and a support unit for supporting and providing height and rotational adjustments to the camera assembly and the optical fiber exit of the optical fiber in a packaged module. The system also includes at least one filter for spectral and spatial filtering as well as an optical multiplier for enlarging the image of the target. The system includes, as well, a coupler assembly for coupling the optical axis of the laser device with the optical axis of the camera assembly, the coupler assembly including transmit/receive optics. The optical axis of the laser device can also be substantially parallel to the optical axis of the camera assembly.

The coupler assembly includes a collimator for collimating the laser beam, a mirror means for deflecting and converging the laser beam, and an optical coupler including a mirror splitter for coupling the optical axis of the laser beam with the optical axis of the camera assembly. The laser device includes a Diode Laser Array (DLA) which can be implemented in the near IR range or the blue-green range of the visible light spectrum. The camera assembly can include a Charge Coupled Device (CCD), a Gated Intensified Charge Injection Device (GICID), a Gated Intensified CCD (GICCD), a Gated Image Intensifier, or a Gated Intensified Active Pixel Sensor (GIAPS).

According to another aspect of the invention, a gated camera imaging method is provided. The method includes the procedure of generating, preferably by a Diode Laser Array (DLA), a laser beam in the form of long duration pulses, toward a target. The method further includes the procedure of receiving the energy of light reflexes of the pulses reflected from the target by a gated camera. The gated camera is synchronized to be set OFF for at least the duration of time it takes the laser device to produce a laser pulse in its substantial entirety, including an end of the laser pulse, in addition to the time it takes the laser pulse to complete traversing a zone proximate to the laser device and back to the gated camera. The gated camera is set ON for an ON time duration thereafter until the laser pulse reflects back from the target and is received by the gated camera. The laser pulse width substantially corresponds to at least the ON time duration.

BRIEF DESCRIPTION OF THE DRAWINGS

The present invention will be better understood and more fully appreciated by studying the following detailed description, taken in conjunction with the drawings and attachments, in which:

FIG. 2 constitutes a graph depicting the laser beam dispersion by its irradiance on a target and backscatter radiant intensity through a mainly homogenous medium as a function of the range.

DETAILED DESCRIPTION OF THE PREFERRED EMBODIMENTS

Figure 1:
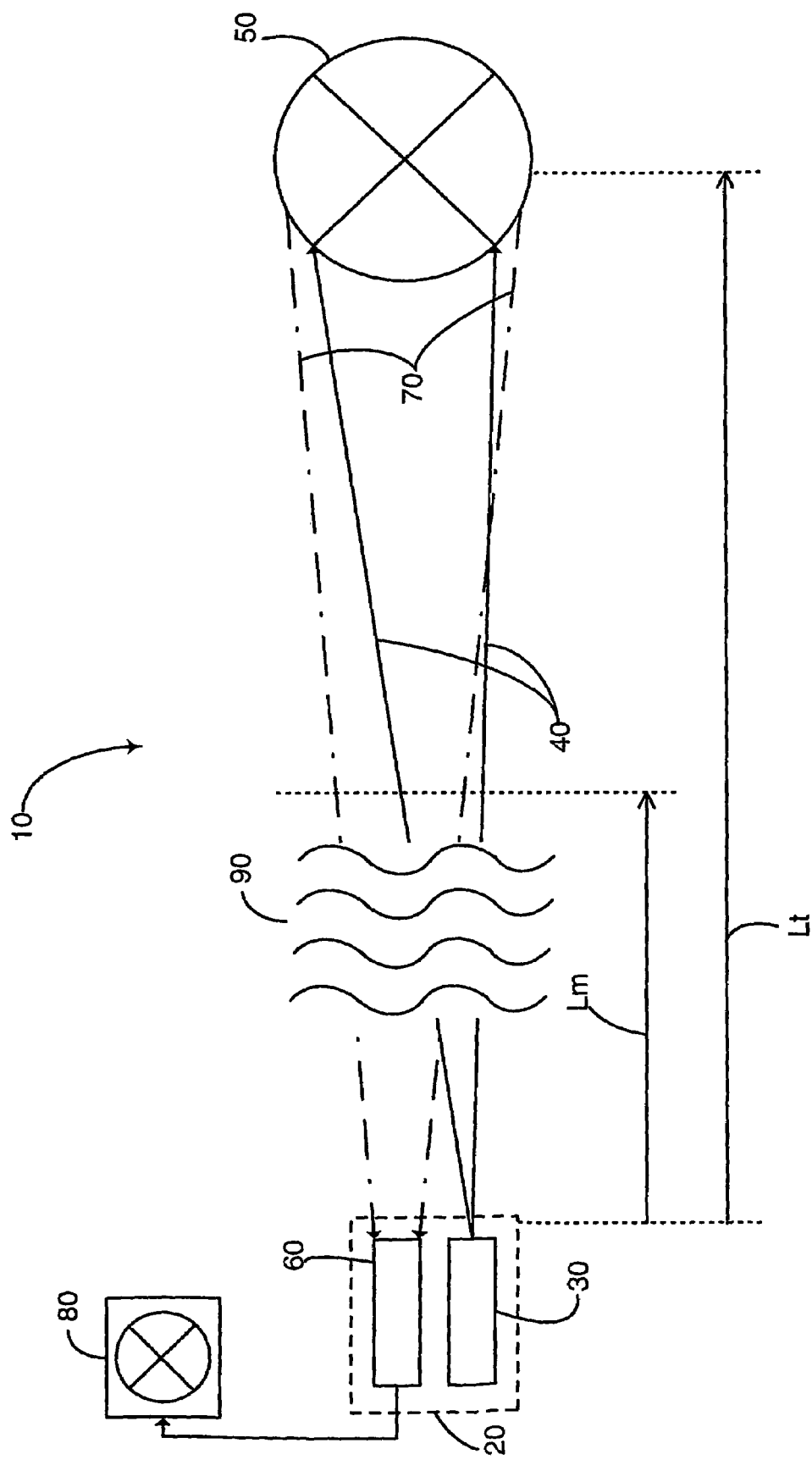
FIG. 1 is a schematic sketch of a conceptual operation scenario of a gated camera imaging system constructed and operative in accordance with the invention.

Reference is now made to FIG. 1 which is a schematic sketch of a conceptual operation scenario, generally designated 10, of a gated camera imaging system constructed and operative in accordance with the invention, generally designated 20.

System 20 includes laser device 30 for producing laser beam 40 in the form of a continuum of pulses (continuous sequence), and the illumination of distant target 50 by laser beam 40. Laser device 30 produces laser beams 40 of long duration (in the microsecond range). The long duration of the pulses can eliminate the necessity of utilizing high energy pulses, thereby allowing low energy pulses to be used with sufficient reflected intensity from target 50.

System 20 further includes camera assembly 60, which receives the energy of reflected light reflexes 70 from target 50 that was illuminated by laser beam 40.

Camera assembly 60 includes a camera sensor (not shown) for processing and converting reflexes 70 from laser illuminated target 50 as the reflexes are received by camera assembly 60 for displaying televised image 80 of the target. A switching assembly (not shown) synchronizes the camera sensor operation.

Haze, dust, smoke, rain, and other inclement conditions, represented by zone 90, exist in the space relatively adjacent to the location of system 20, up to approximately range Lm, and constitute major interfering factors with laser beam 40 on its way to illuminate target 50. Range Lm demarcates the range of zone 90 for which camera assembly 60 is set to the OFF state once laser beam 40, in its substantial entirety, including the end of the laser beam, is on its way to target 50 through zone 90. The length from system 20 to target 50 is designated as Lt.

Camera assembly 60 is set to the OFF state for the duration of time it takes laser device 30 to produce laser beam 40 in its substantial entirety, including the end of the beam, in addition to the time it takes the end of a pulse of laser beam 40 to traverse the atmosphere relatively near system 20 until the end of the pulse of laser beam 40 travels range Lm on its way to the target and back to camera assembly 60. The OFF state once the pulse of laser beam 40 has been fully generated, is substantially equivalent to the time a pulse portion travels through a distance totaling 2·Lm. At this instance camera assembly 60 is set to the ON state, for an ON time duration until the reflected reflexes from target 70, in their substantial entirety, are received by camera assembly 60; in this sense, camera assembly 60 is gated. Since at this very instance, when camera assembly 60 is set to the ON state, the end of the pulse of laser beam 40 is distanced 2·Lm from camera assembly 60, it will travel a further distance of Lt−2·Lm until target 50 and Lt until completing its reflection back to camera assembly 60 totaling 2×(Lt−Lm).

It is desirable that reflections from the target of the full laser pulse width be received by camera assembly 60. If the full laser pulse width from which beam 40 is produced is substantially similar in its duration to the ON time duration, in the time domain, then reflections from the whole range Lt-Lm will be received by camera assembly 60. However, reflections from objects slightly beyond Lm include only a small portion of the end of the pulse of laser beam 40, while reflections from objects close to target 50 (close to range Lt) include most of the pulse of laser beam 40. The time interval it takes the laser pulse to travel to and from target 50 (2·Lt) is also the maximum range for which camera assembly 60 can be set to the ON state. According to the above description, both the laser pulse width and the ON time duration for which camera assembly 60 is set to the ON state, are generally given by $$\frac{2 \times (Lt - Lm)}{c},$$

where c is the speed of light constant.

For example, if a target is distanced at a range of Lt being equal to 25 km and Lm equal to 3 km, then the length of the laser pulse will substantially last for a time duration of 146.7

$$\mu s \left( \frac{2 \times (25 \text{ Km} - 3 \text{ Km})}{c} = 146.7 \text{ micro sec} \right).$$

It will be appreciated that minor deviations from this length, for example within a tolerance of ±10%, will still be considered substantially similar to the above mentioned result. This characteristic of the invention is defined as Long Pulse Gated Imaging (LPGI).

The length of laser beam 40 is substantially equal to twice the length of the region to be imaged by camera assembly 60, namely the difference between twice Lt and twice Lm. Preferably, a longer laser beam is not used, because it will use excessive energy, beyond the time span of the ON state. It will require more waiting time until the cycle ends and thereby prolong the cycle. It will further prolong the cycle because the camera assembly has to be set to an OFF state at the beginning of the cycle until the full pulse width is emitted. Aside of such deficiencies, a longer duration pulse width is still applicable. A substantially shorter laser beam is not favorable because it is desirable to have the maximal reflection at the farthest point within region Lt, namely where target 50 is. This will optimally compensate for the attenuation of reflected light which is proportional to the reflection range. The further an object is distanced within range Lt, the greater is the received portion of the pulse width, until all of it is received for the target 50 at Lt. The length of the laser pulse used is in the microsecond range which is significantly longer than the length of laser pulse used in traditional laser imaging systems, where the length of the laser pulse used is usually in the nanosecond range.

Once laser beam 40, which is long in duration, has been fully generated, the beginning part of laser beam 40 has already been reflected by target 50 and is on its way back to camera assembly 60 as light reflexes 70. At this instance, the end of generated beam 40 is still within distance Lm, whereas the beginning of generated beam 40 that was reflected by target 50 is still between distances Lm and Lt. In order to prevent camera assembly 60 from receiving light reflexes in Lm, camera assembly 60 is set to the OFF state while the end of generated beam 40 is located in Lm, in addition to the time it would take a reflected beam in region Lm to reach camera assembly 60, meaning camera assembly 60 is set to the OFF state for a time duration of twice Lm. After this time, the end of generated beam 40 is located just beyond twice the distance Lm, and the beginning of generated beam 40 that was reflected by target 50 is located just in front of camera assembly 60. At this moment, camera assembly 60 is set to the ON state which only allows light reflexes between distances Lm and Lt to be received by camera assembly 60. When the end of generated beam 40 has already passed twice the distance of Lm, any light already reflected in region Lm has already been sent back to camera assembly 60 while camera assembly 60 was still in its OFF state.

According to another aspect of the invention, there is provided a gated camera imaging method. This method is described with reference to FIG. 1. The method includes the procedure of generating a laser beam (30, 40) of long duration and low energy in the form of pulses, toward a target (50). The procedure for generating the laser beam (30, 40) preferably includes generating the laser beam (30, 40) by a Diode Laser Array (DLA), described below with reference to FIGS. 4 and 5. The method further includes the procedure of receiving the energy of light reflexes of the pulses (70) reflected from the target (50) by a gated camera (60).

The gating is synchronized to be set OFF for at least the interval a laser pulse is generated in its substantial entirety, including the end of the laser pulse, in addition to the interval a laser pulse completes traversing a zone (Lm) proximate to the laser device (30) and back to the gated camera (60), and set ON thereafter until the laser pulse reflects back from the target (50) and is received, in its substantial entirety, including the end of the laser pulse, by the gated camera (60). The laser pulse width substantially corresponds to its propagation time from twice the range of zone (90) proximate to the system (20) (distance 2·Lm) to the target (50) (distance Lt−2·Lm), and back to the gated camera (60) (distance Lt); this sums up to the difference between twice Lt and twice Lm.

Reference is now made to FIG. 2 which constitutes a graph depicting a laser beam's dispersion by its irradiance on a target and its backscatter radiant intensity through a mainly homogenous medium, in units of lumens per square meter, as a function of the range of the target, in units of kilometers. The graph is based on a simulation of a typical airborne system in the conditions specified at the bottom of FIG. 2.

More specifically, FIG. 2 shows the effective intensity of a beam of radiation in its passage through an atmosphere with an aerosol density profile typical of an elevation above sea level. In addition, FIG. 2 shows the residual light intensity dispersed as light reflexes from the target as perceived by camera assembly 60 (see FIG. 1) when the system is operating in an LPGI mode. The measurements of light intensity depend on the distance to a target, the target being at sea level elevation.

For comparison purposes, the light intensities of a similar laser illuminator, operating when the camera is not in an LPGI mode, are also depicted in FIG. 2 (the "non-gated" curves) under the same environmental conditions.

By studying FIG. 2, it is noted that under an LPGI operational mode, the light intensity scattered backwards as reflexes is negligible relative to the effective intensity of the reflection of light that impinged on the target's surface. This is the case when the target is within the 3 to 25 km range.

On the other hand, when the system is not operating in an LPGI mode, the intensity of scattered light reflected backwards as reflexes is higher than that of the intensity of the reflection of light that impinged on the target's surface; this is already from a range of approximately 2 km.

It can also be deduced from FIG. 2 that implementing the LPGI method improves the contrast of the illuminated target against the backscattered light intensity at any range between 3 and 25 km. The method thus does not require knowledge of the exact range to target. With reference to FIG. 1, the LPGI method does not require knowledge of the exact range Lt to target 50. Rather, a rough estimate of range Lt is sufficient in order to calculate the required length of the laser pulse, or to approve the adaptability of a known length of laser pulse.

With the implementation of the LPGI method, the light intensity that the system projects on targets, found for example in the range of 4 to 20 km, changes by less than a factor of ten. However, without the implementation of the LPGI method, the light intensity projected on targets by the system varies by a factor of 100 in the same range of 4 to 20 km.

From the above description, an additional advantage of surveillance and observation systems, constructed and operative according to the present invention, can be derived. The advantage is the system's efficient observance ability across a versatile depth of field of view, which refers to the ranges of view confined within certain limits. The observation systems that are designed in accordance with the present invention will produce a high quality image of targets in both relatively near and faraway distances from the observation systems.

This property of versatile depth of field responsiveness is highly relevant in the context of a TV picture that has an inherent relatively low intra-scene dynamic range. It is noted that the term 'TV' or 'television' herein also refers to all aspects of known video technology. This property prevents the self-blinding and overexposure phenomena of near objects in the picture, which occurs when using auxiliary illumination without the gated imaging feature. Self-blinding and overexposure are prevented because no reflected light is observed up to the minimal range (Lm equal to 3 km in FIG. 2) in which reflected light is observed and because the difference in observed intensities between nearby and faraway objects is relatively small (a substantially flat curve for the gated target irradiance in FIG. 2).

The apparent brightness (intensity) differences between targets and backscatter, for ranges extending from the nearby (3 km) all the way to the faraway (25 km) targets are substantially lower in the gated system, by order of magnitudes, from the differences between targets and backscatter in the non-gated system in the same ranges. This is shown by comparing the gap between the gated target irradiance curve and the gated backscatter radiant intensity curve in FIG. 2, to the gap between the non-gated target irradiance curve and the non-gated backscatter radiant intensity curve in the same figure. The non-gated target irradiance curve merely results from the inverse square law $$\left(\frac{1}{r^2}\right)$$

of light attenuation, governed by the geometrical propagation of a light beam from its source to a target, with the addition of energy attenuation resulting from propagation through the atmosphere to the target and back.

As already noted above, according to another aspect of the invention, in long-range observation systems for daytime and nighttime applications in accordance with the present invention, no advanced, exact range measurement to the target is required, except perhaps a rough estimate of the range of the sought target. From the instant that the end of the laser beam passes through the atmosphere adjacent to, or relatively near, the observation system and back to the camera sensor, the camera sensor is switched to the LPGI operational mode and awaits the light reflexes from the target. The timing of the camera sensor is such that within minimal range Lm (see FIG. 1), where there are possible inclement atmospheric conditions through which the end of the laser beam traverses, either on its way to the target or as backscatter from such atmospheric conditions within minimal range Lm, the camera sensor is switched to the OFF state.

To achieve the elimination of backscattered light without loss of contrast while maintaining a high quality image of target and background, it is sufficient to toggle the camera sensor to the OFF state while the end of the beam traverses the atmosphere for approximately 3 km, while on its way to the target and as backscatter from interfering objects in the atmosphere up to 3 km from the camera sensor.

Figure 3:
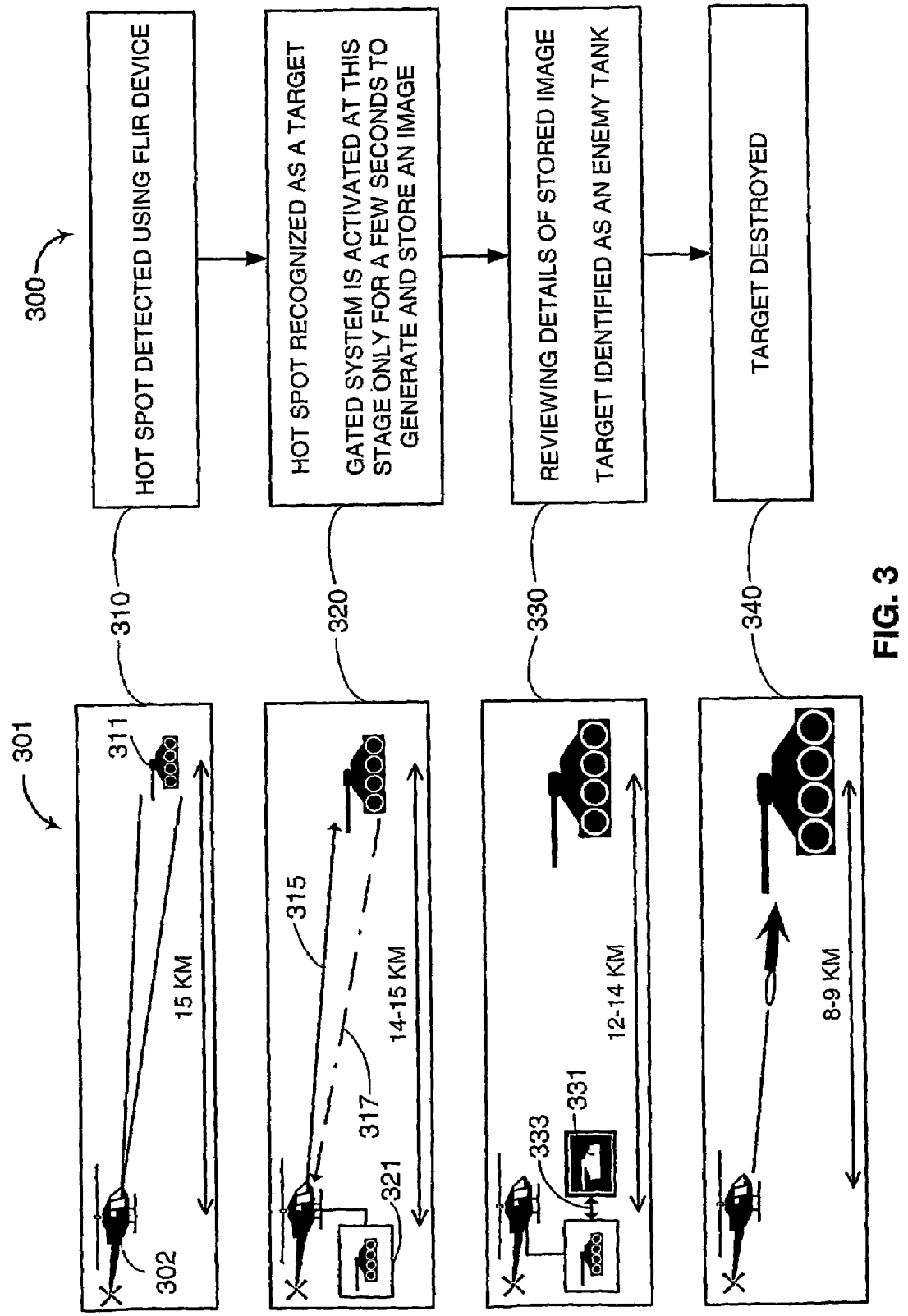
FIG. 3 is a block diagram demonstrating an application of a method operative in accordance with another embodiment of the invention, accompanied by an illustration of a conceptual operation scenario.

Reference is now made to FIG. 3, which is a block diagram demonstrating an application of a method operative in accordance with another embodiment of the invention, generally designated 300, accompanied by illustration of conceptual operation scenario 301. In illustrated example 301, attack helicopter 302 equipped with an observation system according to the present invention is involved in an anti-tank operation scenario at night.

In the first stage 310, the helicopter crew detects, using its FLIR device, hot spot 311 at a 15 km range. In the second stage 320, when the helicopter is distanced at 14-15 km from the hot spot, the surveillance and observation system in accordance with the present invention is activated. Only during the course of this stage are laser beams emitted in direction 315 and reflected from the target in direction 317. The gated system is operated for only a few seconds, which is sufficient for storing in the system enough images from which a picture of target 321 is generated and stored. The radiating laser beam may expose helicopter 302 and the limiting of its exposure to a few seconds helps to protect helicopter 302 from being detected. In the third stage 330, the helicopter crew reverts to a passive operation mode, i.e. a relatively safer operation mode, while advancing towards the identified target. When the helicopter arrives at a distance of 12-14 km from the target, the identification stage of the picture is completed by reviewing its recorded details, such as by comparison 333 with potential target images stored in data bank. In the example shown in FIG. 3, the hot spot is identified as a legitimate target, namely, enemy tank 331. In the final stage 340, the helicopter crew activates a weapons system, for example a homing missile on the hot spot's thermal radiation, and destroys the target from a relatively distant range, for example at a range of 8-9 km.

Thus in the course of the operation as described by sequence 310 to 340, the system in helicopter 302 had no need to make an advanced, exact range to target measurement, a measurement that would have necessitated operating a radiating laser for an extended period of time, thereby increasing the likelihood of exposure and detection of attacking helicopter 302 by its opponents.

Figure 4:
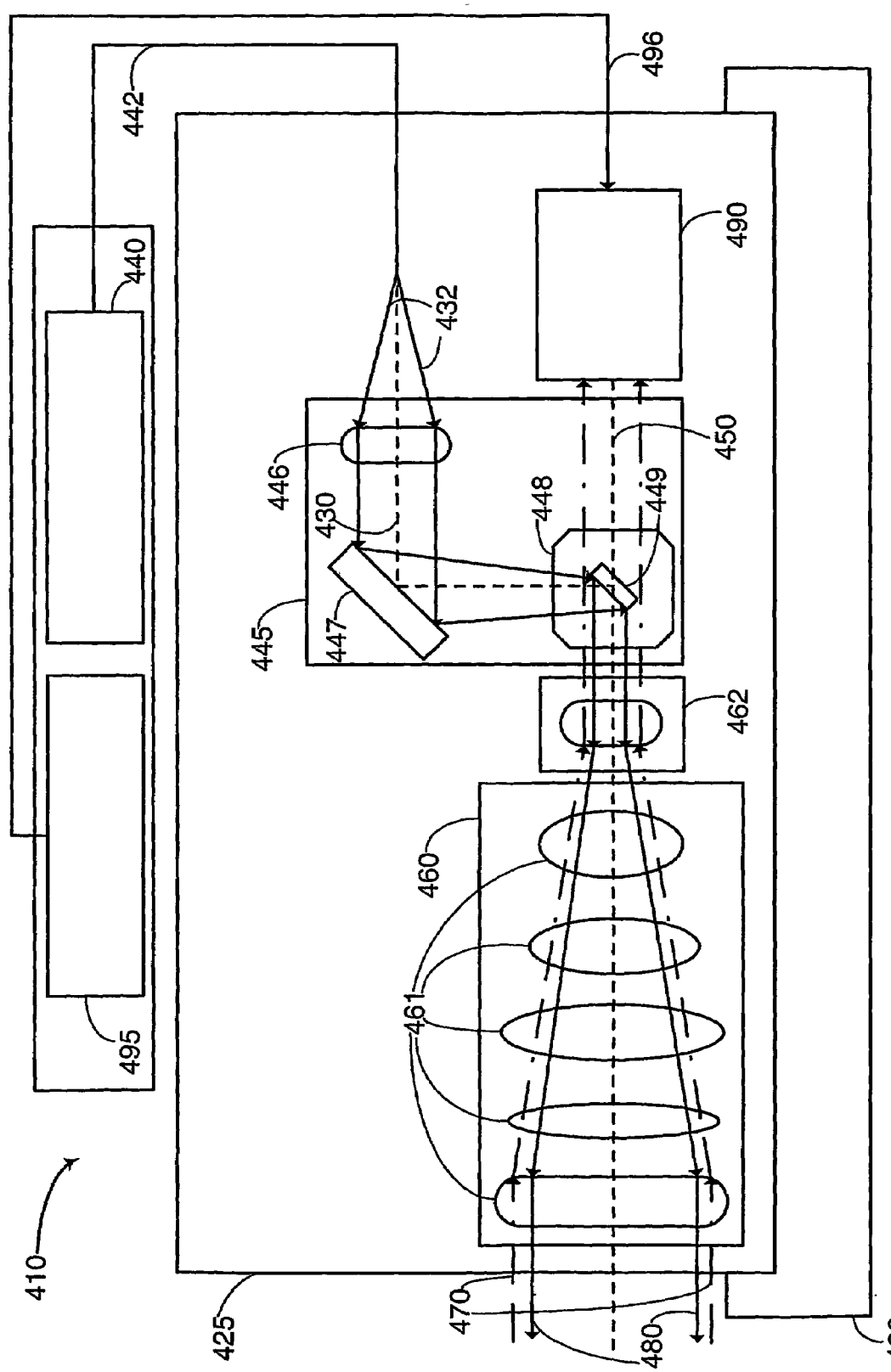
FIG. 4 is a schematic illustration of a further embodiment constructed and operative in accordance with the invention, stabilized by a gimbaled means, in which the optical axis of the illuminating laser beam in coupled with the optical axis of the observing section.

Reference is now made to FIG. 4, which is a schematic illustration of a further embodiment constructed and operative in accordance with the invention, generally designated 410, stabilized by gimbaled means 420, in which the optical axis of the illuminating laser beam is coupled with the optical axis of observation module 425. Stabilizing system 410 is required when the system is positioned on a continuously moving and vibrating platform, whether airborne, terrestrial, or nautical, for example an airplane, helicopter, seacraft, land vehicle, and the like.

Optical axis 430 of laser device 440 is coupled to optical axis 450 of optical assembly 460. Optical assembly 460 includes transmit/receive optics for receiving reflexes 470 returning from the target and directing them to camera assembly 490, and for transmitting laser beam 432 to the target.

Laser device 440 that is implemented in this embodiment of the invention is a laser device of the Diode Laser Array (DLA) type, a device that advantageously imparts packaging capabilities and further benefits to the system.

Using DLA type laser devices allows the laser beam to propagate through optical fibers. Fiber optics enables a manufacturer to package the laser source itself, which is inherently heavy, outside the packaging section stabilized by the stabilizing gimbal, such as observation module 425. This thus achieves important packaging and weight restriction advantages.

Observation module 425 includes optical assembly 460 that receives reflexes 470 returning from the target (not shown), that was illuminated by laser beam 480. Observation module 425 further includes camera assembly 490 for processing and converting the reflexes from the illuminated target as received by optical assembly 460 into an image displayable on a TV. Observation module 425 further includes and electronic switching assembly 495 for timing the camera assembly's operation.

Laser device 440 transfers the beam it generates via optical fiber 442. Laser device 440 and electronic switching assembly 495 are both packaged outside of observation module 425, which is stabilized by gimbal 420. Laser device 440 and electronic switching assembly 495 do not require specialized stabilization and can be packaged separately. Gimbal 420 stabilizes the camera assembly 490, an optical fiber exit of optical fiber 442, optical components for receiving returned reflexes 470 from the target and directing them to camera assembly 490 (such as optical assembly 460 and coupling lens assembly 462), and optical components for transmitting laser beam 432 generated by laser device 440 from the optical fiber exit of optical fiber 442 to the target, such as coupler assembly 445.

Laser beam 432 transferred through optical fiber 442 is further transferred through coupler assembly means 445 used for coupling the optical axis of converged laser beam 430 with optical axis 450 of observation module 425. Coupler assembly means 445 includes collimating lens means 446 that collimates the laser beam, mirror means 447 that diverts the laser beam's direction and converges it onto optical coupler 448, which could be for example an integrating lens, which, aided by tiny mirror 449, couples the optical axis of converged laser beam 430 with optical axis 450 of observation module 425. Optical axis 450 is common to some components of observation module 425, including TV camera assembly 490 and optical assembly 460.

Optical assembly 460 includes array of objective lenses 461 that collimates laser beam 480 once more on its exit from embodiment 410, and receives returned reflexes 470 from the target that was illuminated by laser beam 480. Optical assembly 460 routes returned reflexes 470 via coupling lens assembly 462 unto camera assembly 490.

TV camera assembly 490 that processes and converts the reflexes from the illuminated target as received by optical assembly 460 into an image displayable on a TV, may include a CCD (charge coupled device) type sensor. The CCD sensor is coupled by relay lenses to a gated image intensifier, as known in the art. Alternatively, camera assembly 490 might also include a Gated Intensified Charge Injection Device (GICID), a Gated Intensified CCD (GICCD), a Gated Image Intensifier, a Gated Intensified Active Pixel Sensor (GIAPS), or any similar device.

It is noted that implementing any of the above mentioned sensor types enables advanced processing and enlarging of the received TV image, which could be used, for example, to compare the received TV image to images in a data bank of known identified targets (step 330 in FIG. 3).

Switching assembly 495 controls the timing of camera assembly 490 and receives the TV image from it via suitable wiring 496. Switching assembly 495 can include for example an electronics card.

In accordance with the present invention, switching assembly 495 controls the timing of camera assembly 490 in synchronization with the laser pulses so that it will be deactivated (set to the OFF state) during the time period that the end of the laser beam traverses a space adjacent to the system en route to the target and back to camera assembly 490 (Lm in FIG. 1), and activated (set to the ON state) immediately after that point until the laser pulses reflected from target 470 are received by camera assembly 490. As a result of switching the camera sensor to the OFF state upon firing the laser beam, the reception of unwanted reflexes is prevented in camera assembly 490 and self-blinding of embodiment 410 is avoided.

Figure 5:
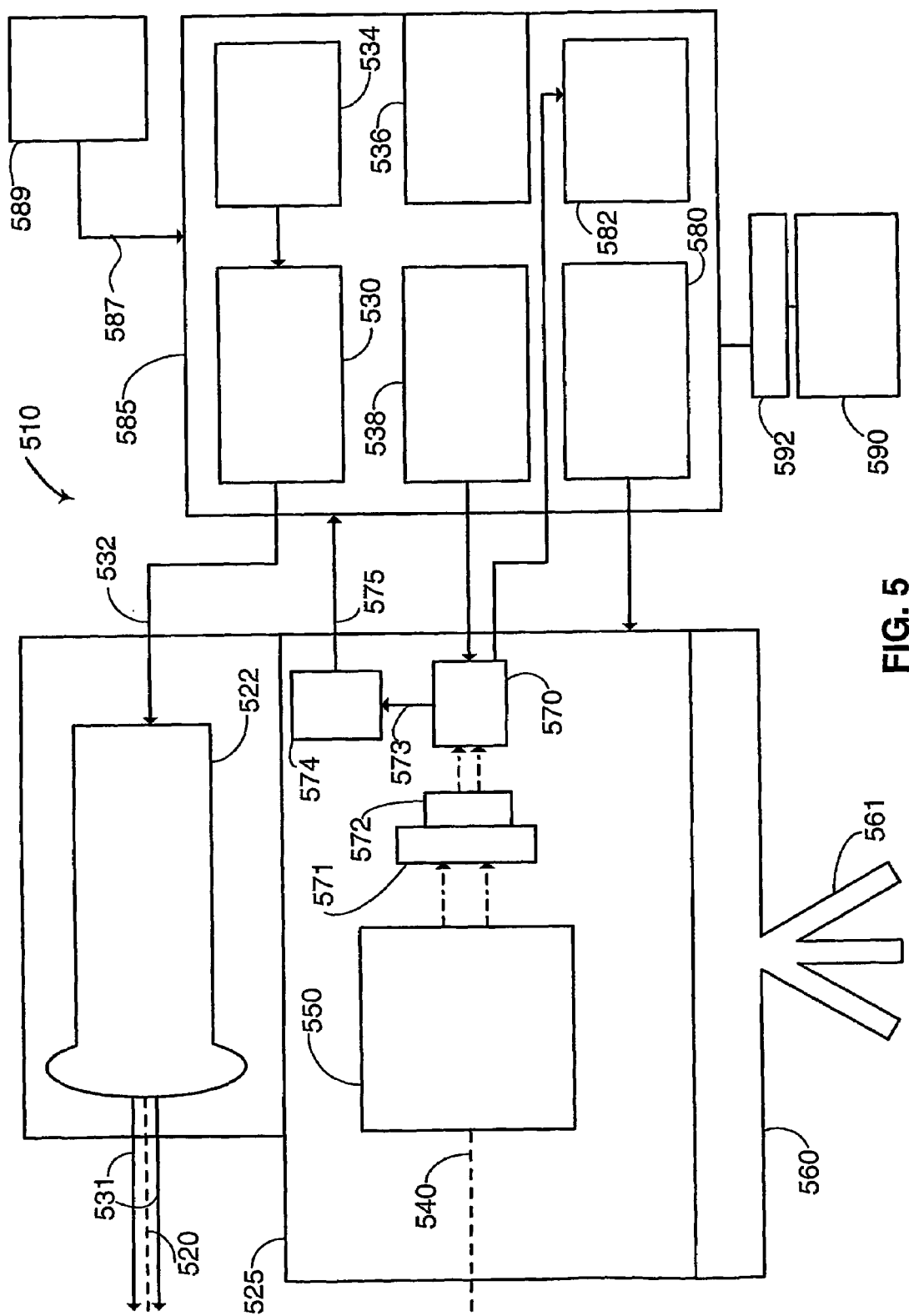
FIG. 5 is a schematic illustration of yet a further embodiment, constructed and operative in accordance with the invention, in which the optical axes of the illuminating laser beam and the camera assembly are essentially in parallel.

The received image of the illuminated target might be subjected to additional processing. Such processing could include, for example, accumulating frames of pictures using, for example, a frame grabber (not shown), integration in order to increase the quantity of light, improving the contrast, additional stabilization relying on gyro feedback to gimbal 420, or electronic stabilization provided by image processing based on a spatial correlation between consecutive TV images, and the like. Reference is now made to FIG. 5 which is a schematic illustration of yet a further embodiment, constructed and operative in accordance with the invention, generally designated 510, in which optical axis 520 of the laser beam of laser device 530 and optical axis 540 of camera assembly 550, are essentially in parallel.

In embodiment 510, laser beam 531 generated by laser device 530 is also of the DLA type. The beam of pulses is propagated from laser device 530 through optical fiber 532 to narrow collimator 522, which is installed on top of observation module 525, which is supported by support unit 560. Optical assembly 550, TV camera sensor 570, and the optical fiber exit of optical fiber 532 are also packaged in observation module 525. Support unit 560 provides for height and rotational adjustments. Support unit 560 can include a tripod, support legs 561 for fine adjustments, and an integral stabilization system (not shown), including, for example, viscous shock absorbers.

In embodiment 510, filter 571 (or an array of filters), as well as optical multiplier 572 (which may comprise many components), are installed in series in front of camera sensor 570. Prior to its entry into camera sensor 570, the reflex passes though filter 571 and optical multiplier 572 which is used to enlarge the image of the target received from the reflexes. Filter 571 might include, as part of its assembly, an adaptive Spatial Light Modulator (hereinafter SLM) made of a transmissive Liquid Crystal Display (LCD), a Micro Electro Mechanical System (MEMS), or other similar devices.

The reflexes from a target on which a laser beam is projected onto, as received by optical assembly 550, undergo spectral and spatial filtering by filter 571, whereby the latter is subject to control by, and feedback from, image processing assembly 580. This is in addition to the temporary filtering that other light sources in the field of view undergo due to the application of the LPGI method and the optic enlargement performed before the reflexes are converted into a displayable TV image, as is known in the art. Such a technique is meant to facilitate separating between the background and the illuminated target, and also to prevent blinding as a result of the presence of intense light sources within the field of view of the embodiment.

Filter 571 might be an adaptive SLM, a spectral frequency filter, a polarization filter, or any other mode selective filter. Filter 571 must have exact characteristics suiting the energy of the reflexes arriving from the illuminated target. With the aid of feedback from image processing assembly 580, it is possible to program filter 571 in a manner that eliminates the background radiation that veils the illuminated target and that is not within the range of the spectrum of laser device 530.

Residual saturation left on the image caused by other light sources in the FOV, for example artificial illumination, or a vehicle's headlights, might be reduced by a factor of up to approximately $1/1000^{th}$ through an adaptive SLM function.

Filter 571 by itself, or optical multiplier 572 by itself, or a combination of the two could be installed directly on the side of optical assembly 550 that outputs the received reflexes from the laser illuminated target to camera sensor 570. Optical multiplier 572 can also be installed directly in front of camera sensor 570.

Besides the components packaged within observation module 525, which is supported by support unit 560, most or all of the remainder of the components of embodiment 510 may be packaged in electronics box 585 including laser device 530, laser cooler 534, technician's service panel 536, and switching and control cards 538. As can be gleaned from FIG. 5, embodiment 510 is packaged in a modular fashion which allows for its speedy packing and deployment, a requirement in field conditions.

In operation, external input voltage 589, for example a battery, or a generator, feeds electronics box 585 via suitable connector 587. The input voltage serves the purpose, inter alia, of running laser device 530.

Laser beam 531 is transferred from laser device 530 via optical fiber 532 to narrow field collimator 522 that is installed on top of observation module 525, thus supported by support unit 560. Laser beam 531 exiting collimator 522 illuminates the distant target and its immediate vicinity (not shown).

Optical assembly 550 depicted in FIG. 5 includes an array of narrow field objective lenses (not shown) packaged on top of support unit 560. Optical assembly 550 receives the light reflexes from the laser-illuminated target and routes it to CCD type camera sensor 570.

The reflexes are processed and converted by the CCD's camera sensor 570 and transferred via cable 573 to electronics card 574 of camera sensor 570. Electronics card 574 is also packaged in observation module 525 which is supported by support unit 560. The image's data is then transferred to electronics box 585 via cable 575 or any other wired or wireless communication link.

In accordance with the invention, switching and control cards 538 synchronize the timing of camera sensor 570 so it will be deactivated (in the OFF state) when the end of the laser beam 531 traverses to the target in a range that is relatively near the system and back to camera sensor 570 (Lm in FIG. 1).

The user interfaces with electronics box 585 through PC card 582 embedded with image processing capabilities. Image processing card 582 enables analyzing and processing the image received from camera sensor 570, for example by comparing the image to a picture in a data bank of identified targets, by local processing of parts of the picture, or by operating an SLM function.

The display of the image as analyzed by a computer (not shown) might be displayed on TV display 590, recorded by VCR 592, or transferred in a suitable way to another location, for example by wireless transmission to a remote location.

A common feature of two observation system embodiments 410 and 510 (FIGS. 4 and 5), is the implementation they both make of DLA type laser devices 440 and 530, correspondingly.

As mentioned above with respect to FIG. 4, DLA type laser devices provide an advantage in that optical fibers can be used to route the laser beam produced, thus enabling easy packaging of a laser device that is inherently heavy. The laser device can be separate and away from the stabilized portion (observation module 525 with support unit 560) of embodiment 510. A DLA type laser device produces a beam of laser energy having relatively high power for extended periods. Since the beam is of a high frequency and relatively low intensity, it can be routed via optical fibers which have limited durability for high intensity power, particularly at the pulse's peak.

Using DLA type laser devices in observation systems constructed in accordance with the present invention imparts additional advantages as will now be elaborated.

A DLA laser produces radiation in the near infrared range, rendering it invisible to the naked eye. At the same time, the wavelength of the laser is very close to the visible spectrum. Image intensifiers, which are readily available for installation in observation systems in accordance with the present invention, are very sensitive to the wavelength of the laser device, and therefore provide good image contrast. Hence, DLA lasers which produce radiation in the near infrared range ensure high image quality even at long ranges.

A DLA laser produces non-coherent radiation so that its beam has a very uniform radiation and the quality of the received image is better than that received when coherent laser sources are used.

A DLA laser enables operation in a "snap shot" mode for observation tasks. This involves sending a series of fast flash bursts, a mode that diminishes the time duration of the laser being active. This, as was mentioned above, reduces the observation system's exposure and risk of being detected.

DLA lasers also offer an improvement from the point of view of an observation system's susceptibility to vibrations. For observation systems in accordance with the present invention that are set on stabilizing gimbals, like embodiment 410 illustrated in FIG. 4, using a DLA type laser device enables switching the TV camera sensor to operate at very short time spans of the long damped vibrations of the gimbal. This allows the received image to avoid being blurred which could have resulted from the vibrations of the system's LOS.

A DLA type laser is considered to be an efficient laser in terms of its efficiency in converting power to light. A DLA type laser delivers more light and less heat than other types of lasers. The laser's spectrum is not safe for the human eye, but in accordance with the present invention, the laser beam is transmitted through relatively wide optics and at relatively low intensities so that the safety range is only a few meters from the laser. The DLA type laser can operate in the near IR light spectrum. In contra distinction, in systems containing laser range finders or laser designators, the safety range might reach tens of kilometers.

A DLA type laser is also considered suitable for observation systems in accordance with the present invention that would operate in sea surveillance from the air, for example airborne systems, and for underwater observation applications. For applications of underwater surveillance and observations, a laser beam in the blue-green range of the visible light spectrum is used, as it performs better for nautical applications.

It will be appreciated by people skilled in the art that the present invention is not limited by what has been particularly shown or described above. Rather the scope of the present invention is only defined by the claims that follow hereafter.

The invention claimed is:

1. A laser imaging system with a gated camera, comprising:
a laser device, for generating a beam of laser energy in the form of pulses toward at least one target; and
a gated camera assembly for receiving the energy of light reflexes of said pulses reflected from said at least one target; said system is characterized in that: the gating of said camera assembly is synchronized to set said camera assembly to an OFF state for at least the time it takes said laser device to produce a laser pulse of said pulses, in addition to the extra time it takes the substantial entirety of said laser pulse to complete traversing a minimal range (Lm) from said laser device, and reflecting back to said camera assembly, and set said camera assembly to an ON state for an ON time duration thereafter until the substantial entirety of said laser pulse reflects back from a maximal range (Lt) from said laser device, and is received in said camera assembly;
said at least one target being located between said minimal range (Lm) and said maximal range (Lt); and
said pulses comprise a long pulse width in the microsecond range or longer, substantially corresponding to at least said ON time duration.

2. The system according to claim 1, wherein said extra time is given by twice said minimal range (Lm), divided by speed of light constant (c).

3. The system according to claim 1, wherein said minimal range (lm) corresponds in a range adjacent to said system in which inclement conditions may be present.

4. The system according to claim 1, wherein said ON time duration is given by twice the difference between said maximal range (Lt) and said minimal (Lm), divided by the speed of light constant (c).

5. The system according to claim 1, wherein said pulse width substantially corresponds to a time duration given by twice the difference between said maximal range (Lt) and said minimal range (Lm), divided by the speed of light constant (c).

6. The system according to claim 1, wherein said laser device comprises a Diode Laser Array (DLA).

7. The system according to claim 6, wherein said DLA provides said beam of laser energy in the range selected from the near IR light spectrum, and the blue-green range of the visible light spectrum.

8. The system according to claim 1, wherein said camera assembly comprises at least one selected from the list consisting of: a Charge Coupled Device (CCD), a Gated Intensified Charge Injection Device (GICID), a Gated Intensified CCD (GICCD), a Gated Image intensifier, and a Gated Intensified Active Pixel Sensor (GIAPS).

9. The system according to claim 1, further comprising an optical fiber for transferring said beam of laser energy from said laser device through said optical fiber.

10. The system according to claim 9, further comprising a gimbal for stabilizing, in a packaged module, said camera assembly, an optical fiber exit of said optical fiber, optical components for receiving said light reflexes and directing them to said camera assembly, and optical components for transmitting said beam of laser energy from said optical fiber exit toward said at least one target.

11. The system according to claim 10, wherein said gimbal comprises a gyro feedback.

12. The system according to claim 1, further comprising an image-process stabilizer.

13. The system in according to claim 9, further comprising a support unit for supporting and providing height and rotational adjustments to said camera assembly and an optical fiber exit of said optical fiber, in a packaged module.

14. The system according to claim 1, further comprising at least one filter, for spectral or spatial filtering.

15. The system according to claim 1, further comprising an optical multiplier for enlarging the image of said at least one target.

16. The system according to claim 1, further comprising a coupler assembly for coupling the optical axis of said laser device with the optical axis of said camera assembly, comprising transmit/receive optics for receiving said reflexes and directing them to said camera assembly, and for transmitting said laser pulses toward said at least one target.

17. The system according to claim 16, wherein said coupler assembly comprises:
a collimator for collimating said beam of laser energy; a mirror means for deflecting and converging said beam of laser energy; and
an optical coupler comprising a mirror splitter for coupling said optical axis of said beam of laser energy with said optical axis of said camera assembly.

18. The system according to claim 1, wherein the optical axis of said laser device is substantially parallel to the optical axis of said camera assembly.

19. A method for laser imaging with a gated camera, comprising the procedures of:
generating by a laser device, a laser beam in the form of pulses toward at least one target; and
receiving the energy of light reflexes of said pulses reflected from said at least one target by a gated camera;
said method being characterized in that:
said procedure of receiving comprises gating said gated camera by setting said gated camera to an OFF state for at least the initial time it takes said laser device to produce a laser pulse of said pulses, in addition to the additional lime it takes the substantial entirety of said laser pulse to complete traversing a minimal range (Lm) from said laser device and reflecting back to said gated camera, and setting said gated camera to an ON state for an ON time duration thereafter until the substantial entirety of said laser pulse reflects back from a maximal range (Lt) from said laser device and is received in said gated camera;
said at least one target being located between said minimal range (Lm) and said maximal range (Lt); and
said pulses comprise a long pulse width in the microsecond range or longer, substantially corresponding to at least said ON time duration.

20. The method according to claim 19, wherein said additional time is given by twice said minimal range (Lm) divided by the speed of light constant (c).

21. The method according to claim 19, wherein said minimal range (Lm) corresponds to a range adjacent to said laser device and gated camera in which inclement conditions may be present.

22. The method according to claim 19, wherein said ON time duration is given by twice the difference between said maximal range (Lt) and said minimal range divided by the speed of light constant (c).

23. The method according to claim 19, wherein said pulse width substantially corresponds to a time duration given by twice the difference between said maximal range (Lt) and said minimal range (Lm), divided by the speed of light constant (c).

24. The method according to claim 19, wherein said procedure of generating comprises generating said laser beam by a Diode Laser Array (DLA).

* * * * *